US012644728B2

(12) United States Patent
    Frachon

(10) Patent No.: US 12,644,728 B2
(45) Date of Patent: Jun. 2, 2026

(54) MAGNET SENSOR AND FERROMAGNETIC POLES

(71) Applicant: Moving Magnet Technologies, Besançon (FR)

(72) Inventor: Didier Frachon, Besançon (FR)

(73) Assignee: Moving Magnet Technologies, Besançon (FR)

( * ) Notice: Subject to any disclaimer, the term of this patent is extended or adjusted under 35 U.S.C. 154(b) by 0 days.

(21) Appl. No.: 18/549,680

(22) PCT Filed: Mar. 8, 2022

(86) PCT No.: PCT/FR2022/050417
    § 371 (c)(1),
    (2) Date: Sep. 8, 2023

(87) PCT Pub. No.: WO2022/189750
    PCT Pub. Date: Sep. 15, 2022

(65) Prior Publication Data
    US 2024/0159570 A1      May 16, 2024

(30) Foreign Application Priority Data
    Mar. 8, 2021    (FR) ....................................... 2102198

(51) Int. Cl.
    *G01D 5/14*        (2006.01)
    *G01B 7/00*        (2006.01)
(52) U.S. Cl.
    CPC ............. *G01D 5/145* (2013.01); *G01B 7/003* (2013.01)

(58) Field of Classification Search
    CPC ................................ G01D 5/145; G01B 7/003
    See application file for complete search history.

(56) References Cited

U.S. PATENT DOCUMENTS

| | | | | |
|---|---|---|---|---|
| 4,503,391 A * | 3/1985 | Hinke | ................... | F02P 7/0675 |
| | | | | 310/68 B |
| 7,375,510 B2 | 5/2008 | Miyata et al. | | |
| 7,671,584 B2 | 3/2010 | Uryu et al. | | |
| 9,810,551 B2 * | 11/2017 | Ausserlechner | ....... | G01D 5/142 |
| 10,564,004 B2 * | 2/2020 | Turner | ............... | G01R 33/0011 |
| 11,614,343 B2 * | 3/2023 | Schott | .................. | G01R 33/091 |
| | | | | 324/252 |
| 11,796,609 B2 * | 10/2023 | Bidaux | .............. | G01R 33/0011 |
| 2005/0172732 A1 | 8/2005 | Feng et al. | | |

(Continued)

FOREIGN PATENT DOCUMENTS

| | | |
|---|---|---|
| EP | 1989505 B1 | 7/2010 |
| EP | 2309229 A1 | 4/2011 |

(Continued)

OTHER PUBLICATIONS

International Search Report for Application No. PCT/FR2022/050417 dated May 31, 2023, 3 pages.

(Continued)

*Primary Examiner* — Reena Aurora

(74) *Attorney, Agent, or Firm* — TraskBritt

(57) ABSTRACT

A magnetic position sensor comprises at least one magnetically sensitive element capable of moving relative to a permanent magnet producing a magnetic field, the magnet of which is embedded in a support made of soft ferromagnetic material having two pole shoes located on either side of the magnet.

19 Claims, 7 Drawing Sheets

(56)                   References Cited

U.S. PATENT DOCUMENTS

| | | |
|---|---|---|
| 2019/0078910 A1 | 3/2019 | Mebach et al. |
| 2019/0140524 A1 | 5/2019 | Wolschlager |

FOREIGN PATENT DOCUMENTS

| | | | |
|---|---|---|---|
| EP | 2496914 | A2 | 9/2012 |
| FR | 2155303 | | 5/1973 |
| WO | 2010/013309 | A1 | 2/2010 |
| WO | 2019/215096 | A2 | 11/2019 |

OTHER PUBLICATIONS

International Written Opinion for Application No. PCT/FR2022/050417 dated May 31, 2023, 6 pages.
Japanese Notice of Reasons for Refusal for Application No. 2023-554353 dated Sep. 19, 2025, 6 pages.

* cited by examiner

MAGNET SENSOR AND FERROMAGNETIC POLES

CROSS REFERENCE TO RELATED APPLICATIONS

This application is a national phase entry under 35 U.S.C. § 371 of International Patent Application PCT/FR2022/050417, filed Mar. 8, 2022, designating the United States of America and published as International Patent Publication WO 2022/189750 A1 on Sep. 15, 2022, which claims the benefit under Article 8 of the Patent Cooperation Treaty to French Patent Application Serial No. FR2102198, filed Mar. 8, 2021.

TECHNICAL FIELD

The present disclosure relates to the field of magnetic position sensors comprising at least one permanent magnet, to detect the passage in front of a magnetically sensitive probe, for relative displacements of the magnet with respect to the probe, which are, depending on the targeted application, linear or angular, or even multi-directional.

BACKGROUND

These sensors are suitable, for example, for monitoring and detecting the angular position of the output axis of an actuator such as, for example, an electric geared motor for thermal engine control applications of a motor vehicle, a truck, transportation, agricultural machinery, etc.

The position information, returned by the integrated electronics of the electric motor to the centralized electronic control unit (ECU) of the vehicle, is decisive for performing the calibration of the actuator (determining the useful journey between stops); it can also be used to refine the control or for diagnostic purposes.

For these applications, the sensor must be in the form of a digital sensor for a displacement that can reach up to 360° with a signal in the "ON" state over a range of 20° to 30° and "OFF" over the complementary angular range, the expected switching tolerance being ±2°.

Another possible integration is that of sensors for detecting linear position of a shaft over strokes of a few tens of millimeters and for which it is important to minimize the magnet volume necessary on the one hand to obtain a sufficient magnetic field so that it can be measured by the magnetically sensitive probe and on the other hand with an accuracy typically less than +/−1%. Examples include the case of detection over 200 mm of the linear displacement of a motor vehicle steering rack or a clutch.

The state of the art proposes numerous "low-cost" solutions with contact (potentiometer sensitive to friction wear) or using optical technology (sensitive to fouling and dust).

For applications that must meet a high level of requirement (very long lifetime, vibration, high thermal amplitude), these solutions are, however, not appropriate and magnetic solutions comprising a movable element exciting a stationary sensitive element are preferred.

For example, patent application US20190078910 describes a vehicle element actuator comprising a casing, an actuator motor in the casing and a rotatable output gear shaft assembly in the casing, containing a rotatable output shaft and a gear. The output gear contains at least one discontinuity defined in the latter, having a magnetic flux signature. A position sensor, containing, for example, a Hall-effect position sensor with an integrated magnet, senses the magnetic flux signature of the discontinuity on the output gear for sensing and determining the position of the output gear shaft assembly. The discontinuities can be of the same or different sizes/configurations, and equally or unequally spaced apart from one another. The discontinuities can be slots or projections or any other feature having a unique magnetic flux signature that can be sensed by the position sensor.

The use of a discontinuity on the output wheel of the reduction gear is not completely satisfactory because the boundaries of the discontinuity can vary with time and temperature, and lead to unexpected switching. Furthermore, a difficulty inherent in these technologies is to be able to detect small angles, for example, 20°, when they are surrounded by very large angles, for example, 340°, while guaranteeing good precision of these small angles when the sensor is subjected to air gap tolerances.

Patent US20190140524 describes a rotary position sensor comprising a rotatable patterned ring magnet, which, in one embodiment, is mounted on the output shaft of an actuator, and comprises a plurality of pairs of north and south pole sections extending around the circumference of the ring magnet in an alternating relationship and defining a plurality of circumferentially extending magnetic field switch points spaced apart at predetermined distances on the ring magnet corresponding to a plurality of predetermined unique positions of the ring magnet adapted for sensing by a switch such as a Hall Effect switch. In one embodiment, the ring magnet comprises a plurality of pairs of north and south pole sections and switch points on the ring magnet of different predetermined lengths and predetermined locations respectively corresponding to a plurality of predetermined ring magnet positions to be sensed.

The use of a multi-pole ring magnet on the output wheel leads to relatively high costs.

In general, these solutions of the prior art greatly restrict the topology of the actuator and the assembly of the reduction gear to allow the output wheel supporting the magnetic target to be positioned in the immediate vicinity of the printed circuit supporting the magnetically sensitive element. These solutions are also restrictive for the printed circuit, which must cover the output wheel carrying the magnet for measuring the axial component: the printed circuit thus greatly restricts the space available for the guiding elements to be inserted.

Implementing the second solution proves complicated. It is in fact necessary to integrate ferromagnetic parts for guiding and concentrating the magnetic flux, which are bulky. In addition, it requires a large magnet volume, since the latter consists of a complete ring.

European patent EP1989505B1 is also known in the state of the art, describing a magnetic sensor of rotary, linear or curvilinear displacement using at least one permanent magnet and at least one magnetically sensitive element, which can move with respect to one another. The magnet exhibits a direction of magnetization that varies linearly along the direction of displacement of the magnet on a surface defined by the direction of displacement and a normal direction, with the exclusion of a diametrical magnetization in the case of a rotary sensor. The permanent magnet thus generates a magnetic field whose normal component (Y), on the one hand, and at least one of whose tangential components (X) and transverse components (Z), on the other hand, measured at the surface of the magnet, vary periodically, the normal (Y) and transverse (Z) components varying with the same phase while the tangential component (X) is phase-shifted by a quarter of a period.

This latter solution is very relevant and efficient, but it requires a significant (therefore expensive) magnet volume, since it must cover approximately one time the journey that must be measured and the rotating magnetization is difficult to carry out.

BRIEF SUMMARY

In order to address these drawbacks, the present disclosure relates, in its most general sense, to a magnetic sensor adapted to applications for which the use of iron poles reduces the necessary magnet volume, which provides a significant reduction in costs, and exhibiting an insensitivity with respect to an air gap change, which can occur in a production line, due to manufacturing dispersions or during the life of the sensor, due to wear.

Advantageously, the magnetic position sensor comprises:
    a magnetized structure provided with a permanent magnet
        producing a magnetic field and a support made of soft
        ferromagnetic material wherein the magnet is embed-
        ded, the support having two pole shoes located on
        either side of the magnet,
    at least one magnetically sensitive element that can be
        moved relative to the magnet embedded in the support,
        along a measurement path,
    the magnet and the two pole shoes having respectively
front surfaces that are all located opposite the at least one
magnetically sensitive element during the displacement
along the measurement path, wherein during the displace-
ment along the measurement path, the front surfaces are
successively located opposite the sensitive element and in
that the ratio between:
    the minimum distance between the front surface of the
        magnet and the center of the magnetically sensitive
        element, and
    the minimum distance between one or the other of the
        front surfaces of the pole shoes and the center of the
        magnetically sensitive element, is between 0.7 and 1.3.

According to a first variant, during the displacement along
the measurement path, the front surfaces are successively
located opposite the sensitive element and the minimum
distance, between a front surface opposite the magnetically
sensitive element and the center of the magnetically sensi-
tive element, has variations of less than 50% relative to its
average value.

According to one variant, the magnetic position sensor is
such that the ratios between:
    on the one hand, the minimum distance between the front
        surface of the magnet and the at least one magnetically
        sensitive element, during displacement along the mea-
        surement path, and
    on the other hand, the minimum distance between one or
        the other of the front surfaces of the pole shoes and the
        at least one magnetically sensitive element, during
        displacement along the measurement path, are both
        located between 0.7 and 1.3.

Alternatively, these ratios are both located between 0.9
and 1.1.

In another variant, there are recesses between the pole
shoes and the magnet such that the front surfaces are not
contiguous.

Preferentially, the magnetic position sensor according to
the present disclosure is characterized in that the measure-
ment path is located in a plane and in that in the direction
orthogonal to this plane, the thickness of the pole shoes is
less than the thickness of the magnet.

Still preferably, the sum of the lengths of the front
surfaces of the pole shoes, along the measurement path, is
greater than or equal to the length of the front surface of the
magnet.

As one possible alternative, the length of the front sur-
faces of each of the pole shoes along the measurement path
is greater than or equal to that of the front surface of the
magnet.

According to one variant, the magnetization of the magnet
has a unidirectional magnetization direction.

As one possible alternative, the magnetization of the
magnet is parallel to a plane passing through the magnet and
orthogonal to the path of the relative displacement.

In a second alternative, the magnetization of the magnet
is diametrical.

In a third alternative, the magnetization of the magnet has
a magnetization direction that varies continuously along the
displacement path.

In a fourth alternative, the magnetization of the magnet
has a magnetization whose intensity varies continuously
along the displacement path.

In a fifth alternative, the magnetization of the magnet has
a magnetization direction that varies continuously along 2
directions corresponding to the displacement path.

Advantageously, the magnetically sensitive element is a
temperature-compensated programmable probe according to
the characteristics of the magnet.

According to one particular embodiment, the magneti-
cally sensitive element is a probe for direct measurement of
the magnetic angle or for indirect measurement via the
measurement of the magnetic components constituting an
absolute output sensor based on the mechanical position.

According to one variant, the relative displacement of the
permanent magnet with respect to the magnetically sensitive
element is linear.

According to another variant, the relative displacement of
the permanent magnet relative to the magnetically sensitive
element is rotating.

According to another variant, the relative displacement of
the permanent magnet relative to the magnetically sensitive
element is carried out along several dimensions, for
example, a linear displacement along one dimension and a
rotary displacement along another dimension, without, how-
ever, limiting the combination of these displacements or a
displacement along only two dimensions.

According to one embodiment, the magnetically sensitive
probe is a magnetic switch, the position sensor having
invariant switching positions based on the air gap.

Advantageously, the magnetic switch measures a compo-
nent of the magnetic field and has a switching threshold that
can be programmed.

According to one particular embodiment, the magneti-
cally sensitive probe reconstructs the analog position infor-
mation from the components of the magnetic field collinear
to the displacement and in a direction orthogonal to the
relative displacement.

Advantageously, the magnetically sensitive probe recon-
structs the analog position information from the component
of the magnetic field collinear to the magnetization direc-
tion.

Preferably, the pole shoes have a profile of sculpted shape
according to an algorithm maximizing the precision of the
sensor.

According to one particular embodiment, the support
made of ferromagnetic material consists of a stack of
laminations.

The present disclosure also relates to a mechatronic assembly comprising an actuator formed by a stator consisting of an assembly of ferromagnetic laminations defining teeth, at least part of which is surrounded by a coil, and a position sensor according to the preceding claim wherein the exterior contour of the laminations of the support made of ferromagnetic material of the sensor is contained in the interior contour of the laminations of the stator of the actuator.

Measurement path is understood to mean, in the coordinate system of the magnetically sensitive element, a path representative of the movement described by the center of gravity of the front surface of the magnet over the entire useful stroke for the measurement. During the journey of the measurement path, the point located on one of the front surfaces having the minimum distance with the center of the magnetically sensitive element varies throughout the journey of the measurement path. Thus, an "end of axis"-type sensor known to a person skilled in the art, and for which a probe is located on the axis of rotation of the movable element supporting the magnetized structure, does not exhibit a notion of path within the meaning of the present disclosure because this would lead to a one-time path.

BRIEF DESCRIPTION OF THE DRAWINGS

The present disclosure will be better understood on reading the following description, which concerns a non-limiting exemplary embodiment that is illustrated by the appended drawings, in which.

DETAILED DESCRIPTION

Figure 1:
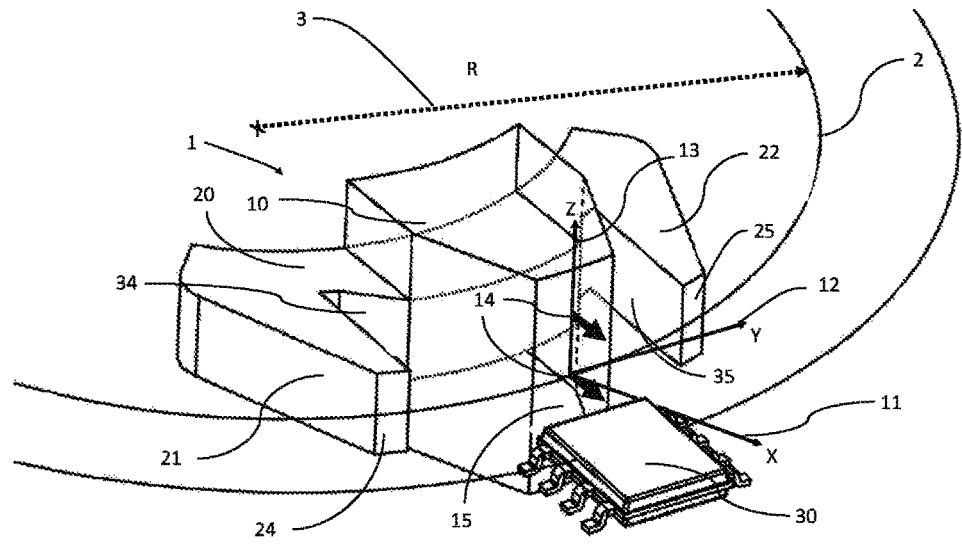
FIG. 1 shows a perspective view of a rotary sensor according to which the magnet is shown in transparency.

For greater clarity, the numbering used in this part is common to the entire document and is to be assessed through the various figures.

The magnetized structure (1) includes a permanent magnet (10) whose magnetization can be variable in terms of direction and intensity, which is associated with a ferromagnetic support (20) consisting of soft iron laminations, forming a configuration defining two adjacent pole shoes (21, 22). This magnetized structure (1), associated with a first assembly, aims to generate a magnetic field that is detected by a magnetically sensitive probe (30) associated with a second assembly, the first and second assemblies being in relative motion along a measurement path (2). The pole shoes (21, 22) as well as the magnet (10) respectively have a front surface (15, 24, 25), that is, which can be located immediately opposite the magnetically sensitive probe (30) during the journey of the measurement path (2), the air gap produced between these front surfaces (15, 24, 25) and the magnetically sensitive probe (30) having small variations. Front surface means a magnetically active surface located in the direct vicinity of the probe, the front surface (15) of the magnet (10) being the surface emitting the magnetic field measured by the probe and the front surfaces (24, 25) being the surfaces of the pole shoes (21, 22) intended to collect the magnetic flux generated by the magnet.

The small variations in air gap allow production of a very compact sensor structure by allowing the probe to be brought closer to the magnetized structure (1) as much as possible. These small variations in air gap also allow maximization of the induction along the measurement path (2). When the air gap variations are too strong, it is necessary to move the magnetically sensitive element (30) away from the magnetized structure in order to avoid the problems of linearity. For example, an important criterion is that the magnet must not be located further away from the magnetically sensitive element (30) than the pole shoes (21, 22); indeed, this remove leads to a significant drop in the magnetic induction measurable by the probe and increases the bulk of the sensor. The reverse, that is, pole shoes (21, 22) that are recessed relative to the magnet (10), is not desirable for the same reasons. One criterion that is defined to meet this need is that along the measurement path (2), the ratio between, on the one hand, the minimum distance measured between the front surface (15) of the magnet (10) and the magnetically sensitive element (30), and on the other hand, the minimum distance measured between one or the other of the front surfaces (24, 25) of the pole shoes (21, 22) and the magnetically sensitive element (30), is between 0.7 and 1.3. For more restrictive applications, this ratio can be limited to a variation between 0.9 and 1.1. Another less generic criterion relates to distance variations within a single front surface (15, 24, 25). During the journey of a single front surface (15, 24, 25) along the measurement path (2), a satisfactory condition is that the ratio between the minimum distance and the maximum distance measured between the front surface and the magnetically sensitive probe remains less than 0.5. Another, more restrictive criterion is linked to the variations in air gap between the front surface (15) of the magnet (10) and the front surfaces (24, 25) of both pole shoes (21, 22). Indeed, in the case where linearity and compactness are real concerns, a satisfactory criterion requires that, for any point of the measurement path (2) for which the probe is opposite a front surface, the magnetic air gap does not have variations greater than 50% relative to its average value.

The shape of the permanent magnet (10), its magnetization profile and the profile of the pole shoes (21, 22) may differ depending on the path (2) of the movement to be analyzed, the goal being to obtain the best possible precision of the relative position of the first and second assemblies, while ensuring good resilience to manufacturing dispersions or dispersions inherent to aging.

Various configurations are shown through the examples presented, aiming at detecting linear or rotary movements, without the latter being limiting with respect to the present disclosure. It would also be possible to imagine that the path (2) to be analyzed is curvilinear.

The magnetization of the magnet can thus have an intensity and/or direction (14) that varies continuously or discretely along the displacement direction. At the extreme, this magnetization can be unidirectional and of maximum intensity to allow saturation of the magnet. Unidirectional magnetization is understood to mean a magnetization of the material in a single direction of a preferentially Cartesian coordinate system. Thus, if the edge effects of the magnet are excluded, the magnetization is parallel to and in the same direction as a given vector at all points. Of course, this type of magnetization is not limiting with respect to the present disclosure and diametrical magnetization, that is, unidirectional in a cylindrical coordinate system, is also envisaged. Finally, a person skilled in the art could imagine associating a different magnetization with a magnet having a shaped pole, either by sculpting the magnet or by adding an additional ferromagnetic material, the unidirectional magnetization being the simplest to carry out and to describe for the purpose of the present disclosure.

The ferromagnetic support (20) is preferentially a stack of laminations of ferromagnetic material in a single piece having, between its pole shoes (21, 22), a recess able to accommodate the permanent magnet (10), preferentially by driving or by injection or any other type of assembly that a person skilled in the art could envisage. One possible alternative is to produce the pole shoes (21, 22) in two stacks of separate laminations then secured to the magnet by means among those known to a person skilled in the art. This alternative is not preferred in the sense that it requires more precautions for the assembly of the pole shoes (21, 22) to the permanent magnet (10); one possibility would be to secure the pole shoes with an overmolding by a plastic material or directly onto the material constituting the magnet. In all cases, the present disclosure involves mechanically embedding the magnet (10) in the support part (20) and does not meet the magnetic bonding forces between the pole shoes (21, 22) and the magnet (10) to ensure the integrity of the first assembly. Indeed, the assembly and holding by magnetic forces does not make it possible to ensure the integrity of the assembly in extreme environments and is very sensitive to manufacturing dispersions. The pole shoes (21, 22) have a shape profile produced by a cutting tool or any other material removal process known to a person skilled in the art. If the support (20) is not the result of a stack of laminations, it can be obtained from a monolithic soft ferromagnetic material, for example, using a sintering process. The pole shoes (21, 22) of the ferromagnetic support (20) expand on either side of the permanent magnet (10), leaving a recess (34, 35) with the magnet (10), such that the front surfaces (15, 24, 25) are not contiguous during the journey of the measurement path. This configuration, although not limiting, has the advantage of avoiding a looping of the flux of the magnet (10) generated at the boundary zone directly in the pole shoes (21, 22) without it being able to pass through the probe, this generally leading to a loss of amplitude of the signal, but also to a degradation of the linearity of the sensor. In the case where these two criteria are not essential, such as for the production of a magnetic switch, the creation of these recesses is not necessary, thus making it possible to obtain more compact elements that are less sensitive to manufacturing tolerances.

The magnetized structure (1) preferentially has symmetrical adjacent pole shoes (21, 22), which are particularly well suited for detecting angles or positions along a rectilinear path, but this is not limiting with respect to the present disclosure, the permanent magnet (10) or the pole shoes (21, 22), also called pole tips, being able to be asymmetrical to measure a position along a curvilinear path or to obtain better linearity when the integration of the sensor into its environment is taken into account.

In the example of FIG. 1, the height of the ferromagnetic support (20) is less than the height of the permanent magnet (10), typically between 15% and 60% of the height of the permanent magnet (10). This configuration both aims at a better securing of the permanent magnet (10) on the support (20), but also confers better regularity of the magnetic flux while maintaining a high magnetic field level, which leads to increased precision of the sensor according to the present disclosure by increasing the signal-to-noise ratio. These teachings are particularly true when the magnetized structure (1) is of small axial thickness, but is in no case a limiting generality of the present disclosure.

Rotary Sensor

Figure 2:
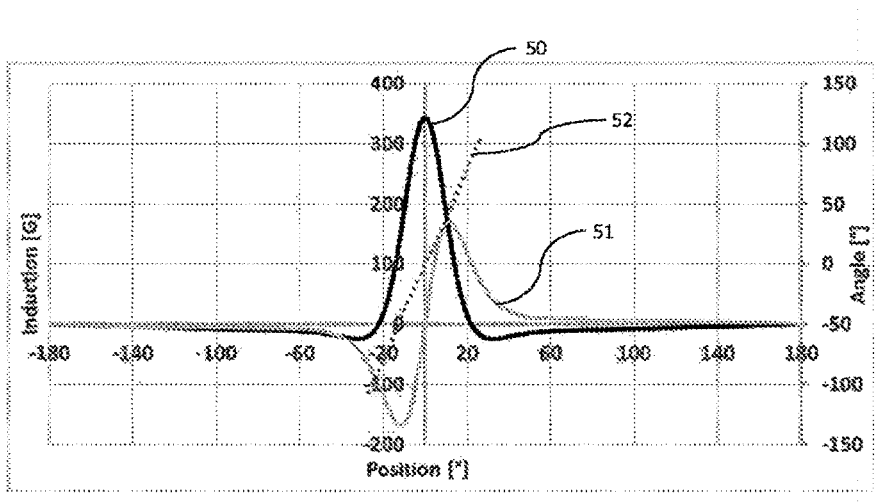
FIG. 2 shows the curves of the radial and tangential components of the induction, as well as the magnetic angle as a function of the position, of a rotary sensor for a reduced active stroke according to the present disclosure.
Figure 3:
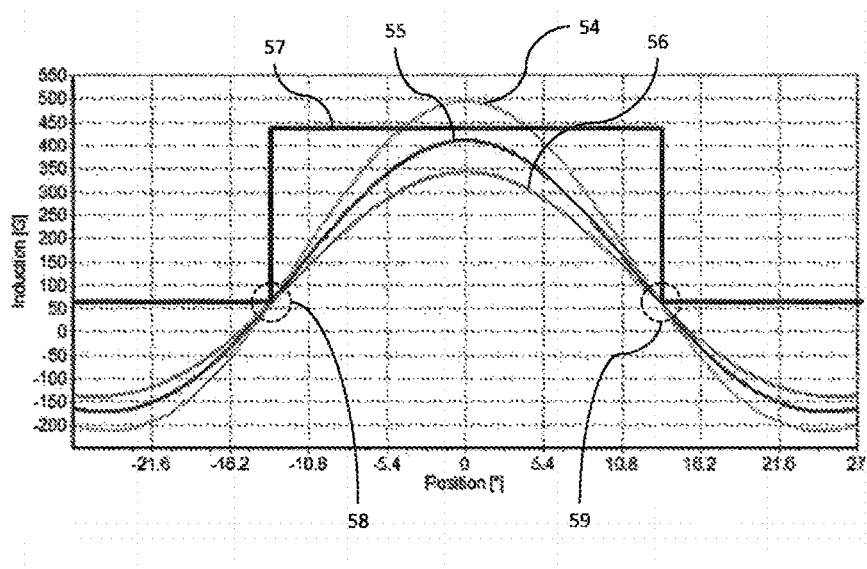
FIG. 3 shows, for several air gaps, the curves of the radial component of the induction based on the position of the shaft of a rotary sensor according to the present disclosure as well as the digital signal coming from the magnetically sensitive probe.

FIGS. 1-3 describe a first example of a rotary sensor according to the present disclosure. FIG. 1 shows a perspective illustration of the magnetized structure (1) opposite the magnetically sensitive probe (30), the latter being set in relative motion along the measurement path (2). The aim here is to provide an angular sensor solution that is robust in terms of endurance and vibration, which is simple and very economical, guaranteeing a large imbalance between the active angular stroke (typically 30°) and the passive angular stroke (typically)330°, with a dependency on the hysteresis due to the ferromagnetic parts and to the remanent induction of the permanent magnet (10) that is very reduced, and finally a signal stability according to the variations in air gap relative to the solutions of the prior art.

Active angular stroke is understood to mean the angular stroke over which an angle is measured, or more simply, to change the switching state of a magnetic switch, the passive angular stroke being the angular range that does not require a measurement or over which the magnetic switch is in the low state.

To this end, the magnetized structure (1) adopts a configuration that concentrates its magnetic variations over a small part of the measurement path (2), here a circle of radius R located in the vicinity of the probe. The magnetized structure (1) is composed of a support part (20), consisting of a stack of ferromagnetic laminations having a central zone extended symmetrically on either side by pole shoes (21, 22), called pole tips here, and a permanent magnet (10) injected by overmolding onto the support part (20) or having a notch complementary to the central zone of the support part (20) to secure them by radial insertion; the magnet (10) being shown transparent in FIG. 1, it is possible to assess its holding on the support part (20). The magnet (10) is magnetized in a single direction (14) of magnetization and a constant amplitude of the magnetic field, oriented, for a rotary displacement application, in a direction comprised in the plane (X, Z) perpendicular to the direction Y (12) of relative displacement of the magnet (10) with respect to the magnetically sensitive probe (30), the coordinate system being fixed relative to the magnet (10). The direction (14) of magnetization is preferentially collinear with the vector X (11) so as to maximize the radial component of the amplitude of the magnetic field, but it may also have a component collinear with the vector Z (13) in order to adapt to manufacturing constraints or to improve the measured field in the case of a particular positioning of the probe. The amplitudes of the radial (50) and tangential (51) magnetic induction measured along this path are typically similar to those shown graphically in FIG. 2. The measurement of these components, by a magnetically sensitive probe, allows digital reconstruction of the magnetic angle (52) according to, for example, the formula $$\alpha_m = \tan^{-1}\left(\frac{Gain \times B_t}{B_r - \text{offset}}\right).$$

It is then possible to measure a variation in the magnetic field of 360° for a rotation of about 60° mechanical, which makes it possible to increase the accuracy of the sensor when the stroke requires evaluation only over a restricted angle.

A second feature of this first embodiment, making it particularly robust to geometric dispersions, is shown in FIG. 3. The graph shows the variation of the radial magnetic induction (54, 55, 56) along three circular paths, concentric to the one shown in FIG. 1, but of different radius (3), the curve (54) corresponding to the smallest radius and the curve (56) having the largest radius. This amounts, generally speaking, to increasing the mechanical measurement air gap. It can then be noted that, systematically, these measurements have a central lobe of positive induction having an inflection point on either side, the inflection points (58, 59) varying very little in terms of angle and amplitude when the magnetic measurement air gap changes. This embodiment is particularly advantageous for producing a magnetic switch whose transition positions from the low state to the high state are very robust with respect to manufacturing or aging tolerances. Indeed, if the transitions of the magnetic switch are matched with the inflection points (58, 59) of the radial induction, the curve (57) shown in FIG. 3 is obtained, which is independent of the distance of the magnetically sensitive probe, the switch made according to the present disclosure then being able to absorb positioning inaccuracies of the probe. Another advantage, not shown here, but typically yielding the same type of results as those shown in FIG. 3, is the insensitivity of these inflection points (58, 59) to the saturation level of the permanent magnet (10). Thus, the three induction curves (54, 55, 56) shown in FIG. 3 could be obtained for a path of the same radius (3), but corresponding to 3 different magnetization levels. In this way, inflection points (58, 59) are obtained with the magnetization level and therefore a sensor that can both absorb a dispersion at the magnetization tool or a partial demagnetization that can occur during the life of the device.

Finally, the inflection points (58, 59) have a relatively high level of induction, here 60 Gauss, which allows a magnetic switch to be obtained that is insensitive to parasitic transitions that can manifest over the entire inactive range when the transition is close to 0 Gauss and the environment is magnetically disturbed.

Of course, the active angular stroke is not limited to small angles, and its increase is accompanied by a greater reduction in the magnet volume compared to the sensors conventionally used in the background art. However, for the rotary versions of the sensor according to the present disclosure, the permanent magnet (10) preferentially has an angular spreading close to half of the angular stroke to ensure a good linearity of the sensor.

The rotary variant of such a sensor associated with a digital probe, for example, allows generation of an index over a predetermined angle that will be very precise, for example, allowing searching for a stroke starting position with a great repeatability.

Figure 4:
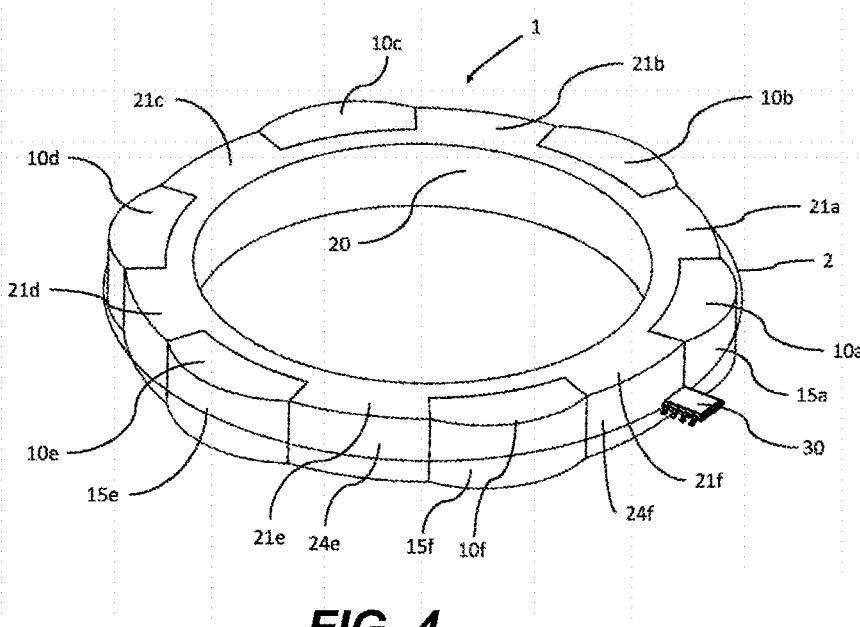
FIG. 4 shows a view of a variant of the rotary sensor according to the present disclosure resting on a multi-pole rotor.

One variant of an angular sensor, as shown in FIG. 4, consists in multiplying N magnetic structures (e.g., magnetic structures 10a-10f) distributed evenly or unevenly over 360°. Associated with a magnetically sensitive probe measuring the magnetic angle directly or the components of the magnetic field, this multi-pole ring allows a magnetic encoder to be produced, for example, to control an electric motor in vector mode.

Linear Sensor

Figure 5:
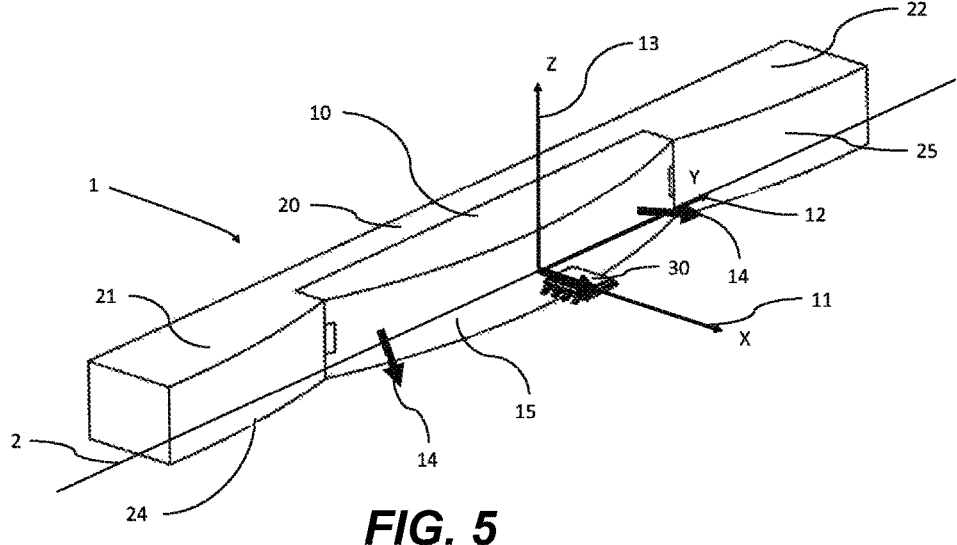
FIG. 5 shows a prospective view of a system according to the present disclosure.

FIG. 5 shows an overall view of a linear sensor according to the present disclosure. In this example embodiment, the magnetized structure (1) comprises a support (20) notched to accommodate a permanent magnet (10) magnetized in a variable direction (14) and a constant amplitude of the magnetic field. The magnetized structure (1) is in relative displacement, with respect to a magnetically sensitive probe (30), along a measurement path (2), this path being linear and in the direction Y.

The support (20) is formed by a stack of laminations or a monolithic bar, made of a soft ferromagnetic material, having a notch for receiving the magnet (10) by plastic injection or adhesive bonding, for example. This support has two pole shoes (21, 22) extending the magnet (10) laterally, on either side.

The shape of the pole shoes allows sculpting of the longitudinal and orthogonal components, at the periphery of the magnet, in order to improve the regularity of the variations in the magnetic field and therefore to minimize the non-linearity of the sensor. The shape of the tips can be calculated with an optimization algorithm associated with digital magnetic calculation software. This calculation may also involve a shape profile on the magnet or even the variable profile of the magnetization to constitute a second or even a third optimization lever. This type of optimization is particularly interesting in the case where it is sought to measure the displacement along a curvilinear path.

It should be noted that the support (20) can be a part of the movable whose displacement is to be measured, or a part added to the latter.

Figure 6:
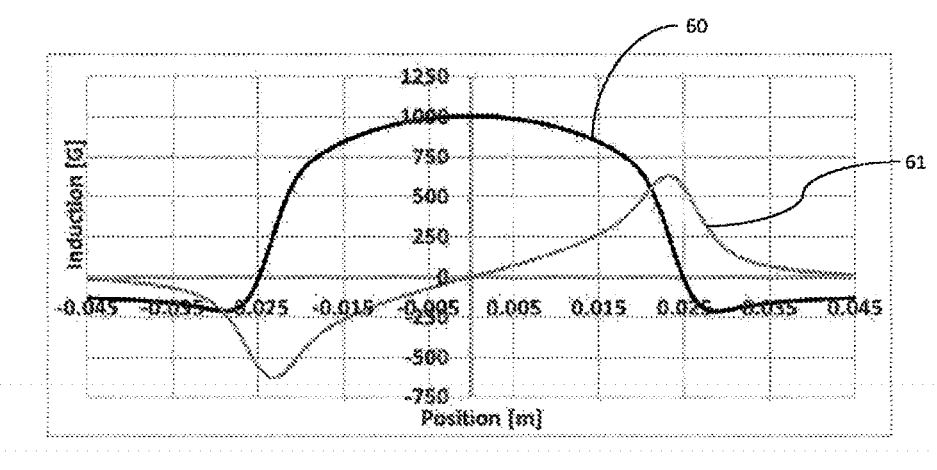
FIG. 6 shows the curves of the components, parallel and orthogonal to the magnetization direction, of the induction based on the position, of a linear sensor according to the present disclosure.
Figure 7:
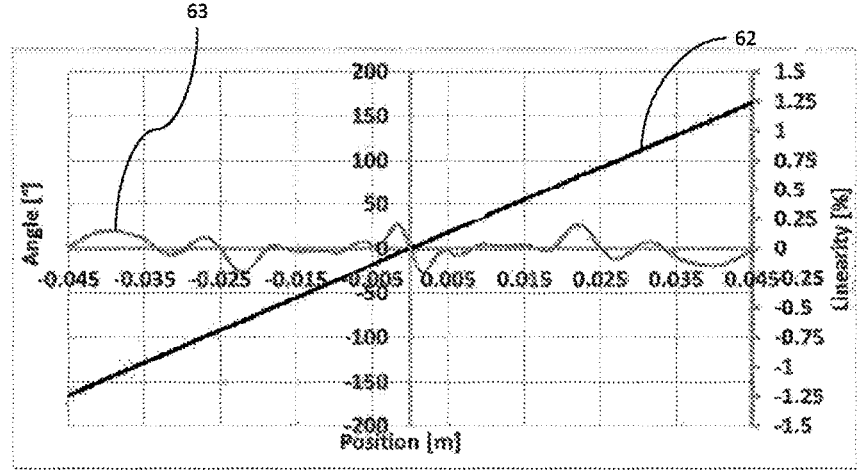
FIG. 7 shows the magnetic angle curves and linearity based on the position of the linear sensor of FIG. 6.

FIG. 6 shows the variations of the magnetic field, generated by the magnetized structure (1), according to two components, when in this particular case it has a single magnetization direction (14), or unidirectional magnetization. One of these components is orthogonal (60) to the displacement, along the X axis (11), and the other is parallel (61) to the displacement, along the Y axis (12). When these two components are associated with a probe having 2 measurement axes or which is sensitive to the magnetic angle, they allow measuring of the position of the magnet (62) that is shown in FIG. 7 and that is accompanied on the curve (63) by the typical linearity defects that this position measurement exhibits. In this example, a measurement over 90 mm of stroke is carried out with an error of the order of +/−0.25% with a magnet of 50 mm length, or approximately half of what is traditionally necessary.

For large strokes, the magnet (10) may have a convex cross section so as to have a greater thickness at the center than at its ends.

The support (20) has, optionally in addition to this feature, an increasing thickness moving away from the magnet, as shown in FIG. 5.

The linear variant of such a sensor associated with an analog output probe, for example, allows detecting the position of a hydraulic jack or else a rack-type mechanical shaft in linear displacement in a casing. One possible application would consist in providing a solution for direct measurement of the steering wheel angle in assisted steering or even a solution for directly measuring the given angle at the wheels in Steer-by-Wire-type steering.

Figure 8:
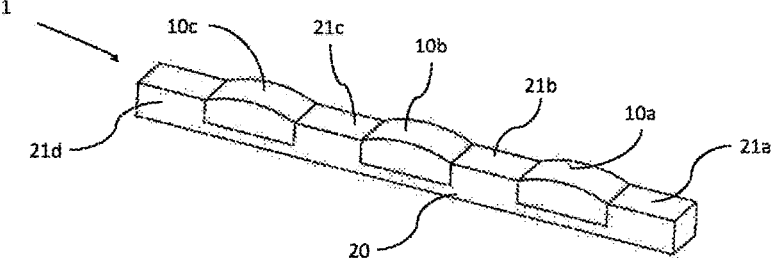
FIG. 8 shows a view of a variant of a linear sensor according to the present disclosure resting on a multi-pole magnetized structure.

One variant of a linear sensor, as shown in FIG. 8, consists in multiplying N magnetic structures (e.g., magnetic structures 10a-10c) distributed evenly or unevenly over the total stroke to be measured. Associated with a magnetically sensitive probe measuring the components of the magnetic field, this multi-polar structure allows extension of the total stroke without degrading the precision. The absolute position measurement remains possible via the use of M magnetically sensitive probes or a magnetically sensitive probe associated with a magnetic rpm sensor element with, in the 2 cases with signals that will be post-processed in order to reconstruct an absolute position.

Axial-Flow Rotary Sensor

Figures 9, 10:
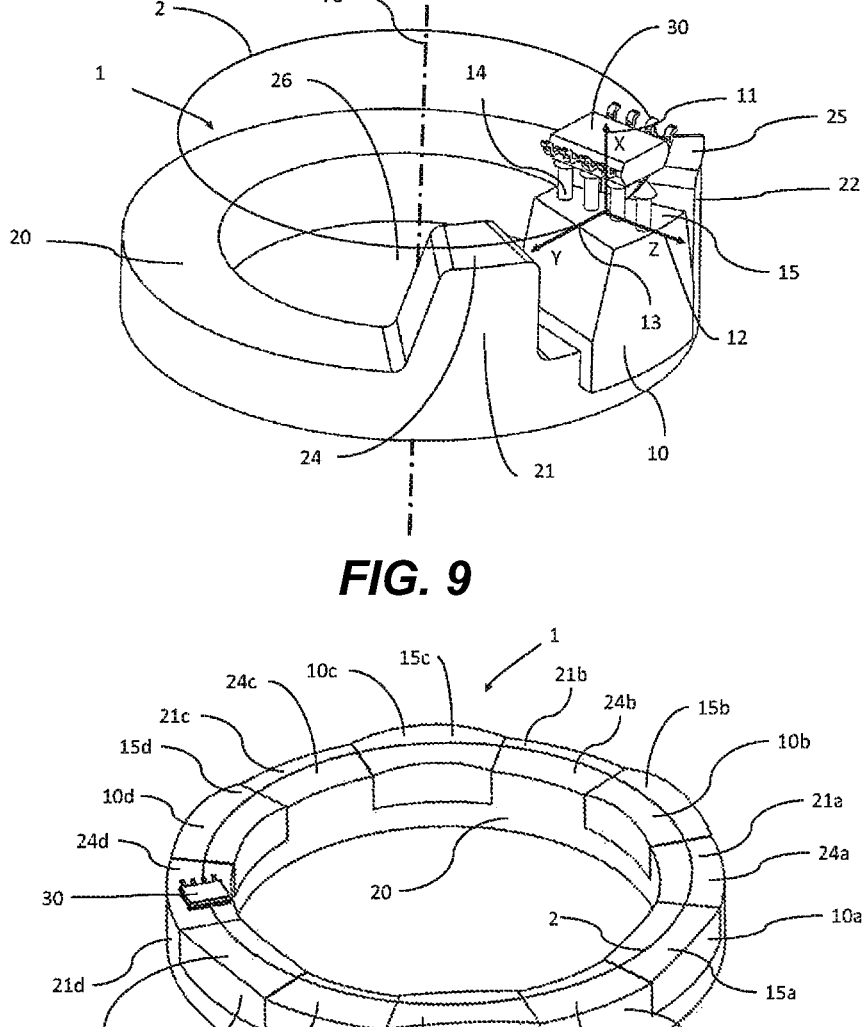
FIG. 9 shows a perspective view of an axial-flow rotary sensor according to the present disclosure.
FIG. 10 shows a view of a variant of the rotary sensor according to the present disclosure resting on a multi-pole rotor.

FIG. 9 shows a view of the magnetized structure (1) and of the magnetically sensitive probe (30) for an axial-sensing rotary sensor according to the present disclosure. It consists of a permanent magnet (10), magnetized in a constant direction and amplitude of the magnetic field, and oriented in a direction included in the XY plane perpendicular to the direction X (11) of relative displacement of the permanent magnet (10) relative to a magnetically sensitive probe. In the versions of rotary sensor with axial detection, the preferred direction of magnetization of the permanent magnet (10) is in the direction Z (13) so as to maximize the magnetic flux collected by the magnetically sensitive probe (30) in this direction.

The support (20) is formed by, for example, a part obtained by sintering an annular-shaped powder having a notch for receiving the permanent magnet (10) by plastic injection or adhesive bonding, for example. The support (20) is axially extended by two pole shoes (21, 22), also called pole tips, located on either side of the permanent magnet (10). The support (20) has a cylindrical passage (26) so as to be assembled on an axis (70), for example, a rotor, whose angular position is to be detected, which confers a particularly interesting solution when the device is intended to be mounted at the end of the shaft, the magnetically sensitive probe (30) being able to be directly integrated into a stationary printed circuit.

Particular Embodiment of the Rotary Sensor

Figure 11:
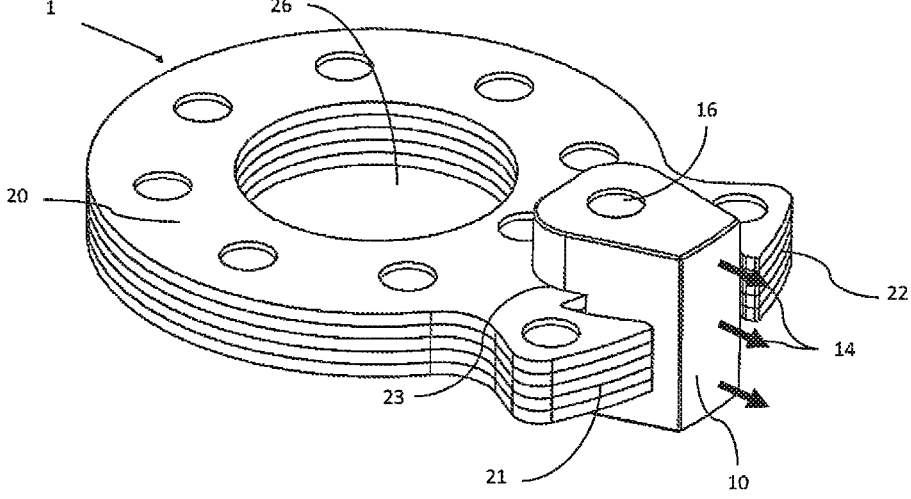
FIG. 11 shows a perspective view of a magnetized structure, optimized for series production, and for a rotary sensor according to the present disclosure.
Figure 12:
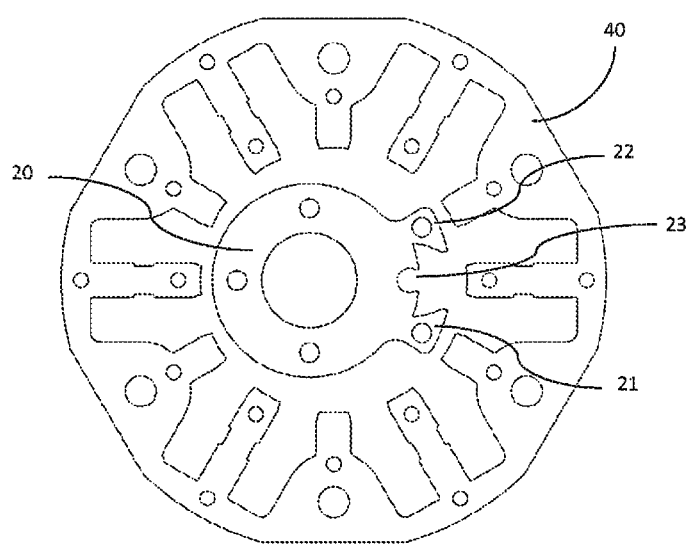
FIG. 12 shows a top view of the cutouts of ferromagnetic laminations of the sensor and of the motor of the actuator with which the sensor is associated.
Figure 13:
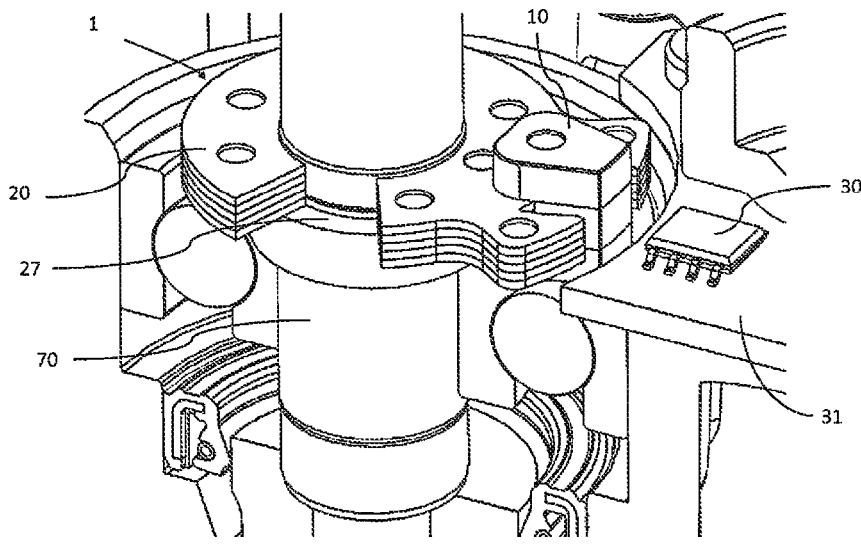
FIG. 13 shows a partial cross sectional view of an actuator fitted with a sensor according to the present disclosure.

FIGS. 11-13 show an embodiment that is particularly well suited to industrial production and to integration into a mechatronic system.

FIG. 11 shows a particular configuration of a support (20) extended at the rear of the pole shoes (21, 22), also called pole tips, by an annular yoke in a stack of annular ferromagnetic laminations defining a cylindrical passage (26) facilitating the mounting of the support (20) on a rotating axis driving the angular displacement of the permanent magnet (10) relative to a stationary magnetically sensitive probe. The two pole shoes (21, 22) delimit a housing (23) for the injection in overmolding of the permanent magnet (10).

The permanent magnet (10) is an injected isotropic magnet, the injection point (16) of which is located axially to avoid having an injection residue in radial protrusion on the exterior diameter (and thus limit the risk of contact with the nearby printed circuit). The magnet has undercuts of 0.5° to 1° max in order to facilitate demolding, except in the thickness zone of the stack of laminations (2.5 mm) where the edges of the magnet are straight/cylindrical, the joint plane of the mold is coplanar with one of the 2 faces of the stack of laminations. However, the injection of the magnet is not limiting with respect to the present disclosure and any other type of magnet and its means for connecting to iron poles are envisaged, such as, for example, overmolding a compressed magnet.

More particularly, the unipolar magnet is produced by overmolding the support (20). A PPS-NdFeB material having good mechanical resistance to temperature is used with high magnetic performance (Br, Hcb): a high switching threshold (>70 G) and a steep slope is thus obtained for proper and well-controlled switchings. The metal support also has a specific shape for radially locking the overmolded magnet. The choice of the stack of laminations as a support allows magnetization after overmolding the magnet without significant effect of the residual magnetization in the laminations (very low coercive field) on the switchings and therefore the precision of the targeted stroke.

To limit the sensitivity to external disturbances and to assembly tolerances, the magnet has a thickness in the axial direction greater than the thickness of the stack of laminations, typically 7 mm for 2.5 mm of iron, or a ratio greater than 2:1, this not being limiting with respect to the present disclosure. At the nominal, the axial median plane of the magnet and of the stack of laminations is coplanar with the sensitive element of the probe.

One variant of an axial-flow rotary sensor, as shown in FIG. 10, consists in multiplying N magnetic structures (e.g., magnetic structures 10a-10f) distributed evenly or unevenly over 360°. Associated with a magnetically sensitive probe measuring the magnetic angle directly or the components of the magnetic field, this multi-pole ring allows a magnetic encoder to be produced, for example, to control an electric motor in vector mode.

As shown in FIG. 12, the ferromagnetic support (20) of the sensor can be produced by using the offcut of material at the center of the stator lamination stack (40) of the electric motor integrated into the actuator. This solution is very economical (recovery of offcuts, no surface treatment to be applied, etc.) and it also allows, especially without remachining, very precise manufacturing tolerances for the force fitting of the support (20) on the axis and for the shape of the two pole shoes (21, 22).

Mechatronic Assembly According to the Present Disclosure

FIG. 13 shows a partial cross sectional view of an actuator fitted with a sensor according to the present disclosure. The support (20) is embedded on the outlet axis (70) of a rotary actuator. It drives the permanent magnet (10), which rotates to be positioned transiently opposite the magnetically sensitive probe (30) mounted on a stationary printed circuit (31). The production is very simple to manufacture and assemble, has a very low cost, and has a high robustness in endurance-vibration-temperature as well as a "precision" below the specified ±2° (in the order of ±0.50°).

The lamination stack is adjusted to the outlet axis of the actuator, it is stopped axially on a shoulder (27) and does not need to be angularly indexed (360° actuator). The shoulder

(27) also allows limiting of the swiveling of the support (20) (short adjustment: 2.5 mm thick for Ø9.8) on the axis, guaranteeing orthogonality between the median plane of the magnet and the axis of rotation. The low mass of the sensor assembly (5 g) makes it possible to estimate that under 28.9 Grims of vibratory disturbances (or 28.9×3×√2=122 G), the assembly will only undergo 6 N of acceleration. In relation to the driving-in forces, which may vary from 250 N to 1250 N, the safety margin of the holding is very good.

The cutout (26) is engaged on the axis of a member whose angular position is to be measured, for example, the axis (70) of an actuator, for a mechatronic assembly.

The axis on which the support (20) is mounted is carried by 2 ball bearings, the upper rolling bearing being guided in the lid, the lower rolling bearing close to the sensor assembly being guided by the housing, the PCB carrying the Hall effect probe being attached to the casing. Thus, the reading radius is precise owing to a chain of dimensions with few links and owing to easily controllable nominal dimensions (machining aluminum, rolling bearing surface, axis surface, stack of stamped laminations, overmolding of the magnet).

Such a structure allows the magnet volume to be reduced to 171 mm³, or a reduction of more than 25% relative to a structure only consisting of magnets.

The invention claimed is:

1. A magnetic position sensor comprising:
   a magnetized structure, including a permanent magnet producing a magnetic field and a support made of soft ferromagnetic material wherein the magnet is embedded, the support having two pole shoes located on either side of the magnet;
   at least one magnetically sensitive element configured to move relative to the magnet along a measurement path;
   wherein the magnet and the two pole shoes respectively have front surfaces all located opposite the at least one magnetically sensitive element during the movement along the measurement path;
   wherein during movement along the measurement path, the front surfaces are successively located opposite the sensitive element; and wherein a ratio between:
      the minimum distance between the front surface of the magnet and the center of the magnetically sensitive element, and
      minimum distance between one or the other of the front surfaces of the pole shoes and a center of the magnetically sensitive element is between 0.7 and 1.3; and
   wherein a sum of lengths of the front surfaces of the pole shoes, along the measurement path, is greater than or equal to a length of the front surface of the magnet.

2. The magnetic position sensor of claim 1, wherein, during the movement along the measurement path, the front surfaces are successively located opposite the magnetically sensitive element and the minimum distance, between a front surface opposite the magnetically sensitive element and the center of the magnetically sensitive element, has variations of less than 50% relative to an average value of a distance between the front surfaces opposite the magnetically sensitive element and the center of the magnetically sensitive element.

3. The magnetic position sensor of claim 2, wherein the first ratio and the second ratio are both between 0.9 and 1.1.

4. The magnetic position sensor of claim 1, wherein:
   a first ratio of the minimum distance between the front surface of the magnet and the at least one magnetically sensitive element, during the movement along the measurement path, and a second ratio of the minimum distance between one or the other of the front surfaces of the pole shoes and the at least one magnetically sensitive element, during the movement along the measurement path, are both between 0.7 and 1.3.

5. The magnetic position sensor of claim 1, wherein recesses are defined between the pole shoes and the magnet such that the front surfaces are not contiguous.

6. The magnetic position sensor of claim 1, wherein the measurement path is located in a plane and the thickness of the pole shoes in a direction orthogonal to the plane is less than the thickness of the magnet.

7. The magnetic position sensor of claim 1, wherein the length of the front surfaces of each of the pole shoes along the measurement path is greater than or equal to that of the front surface of the magnet.

8. The magnetic position sensor of claim 1, wherein the magnetization of the magnet has a single magnetization direction, or unidirectional magnetization.

9. The magnetic position sensor of claim 2, wherein the magnetization of the magnet is diametrical.

10. The magnetic position sensor of claim 1, wherein an intensity of the magnetization of the magnet varies continuously along the movement path.

11. The magnetic position sensor of claim 1, wherein a direction of the magnetization of the magnet varies continuously along the movement path.

12. The magnetic position sensor of claim 1, wherein the magnetically sensitive element is a probe for direct measurement of the magnetic angle or for indirect measurement via the measurement of the magnetic components constituting an absolute output sensor based on the mechanical position.

13. The magnetic position sensor of claim 1, wherein a relative displacement of the permanent magnet with respect to the magnetically sensitive element is linear.

14. The magnetic position sensor of claim 1, wherein a relative displacement of the permanent magnet with respect to the magnetically sensitive element is rotary.

15. The magnetic position sensor of claim 1, wherein the magnetically sensitive element is a magnetic switch, the position sensor having invariant switching positions based on the air gap.

16. The magnetic position sensor of claim 15, wherein the magnetic switch measures a component of the magnetic field and a switching threshold is programmed.

17. The magnetic position sensor of claim 1, wherein the magnetically sensitive element reconstructs analog position information from components of a magnetic field collinear to a direction of relative displacement of the permanent magnet with respect to the magnetically sensitive element and in a direction orthogonal to the relative displacement.

18. The magnetic position sensor of claim 1, wherein the magnetically sensitive element reconstructs analog position information from a component of a magnetic field collinear to a magnetization direction.

19. A mechatronic assembly comprising an actuator having a stator including an assembly of ferromagnetic laminations defining teeth, at least part of the assembly being surrounded by a coil, and a position sensor according to claim 18, wherein an exterior contour of the laminations of the support made of ferromagnetic material of the sensor is contained in the interior contour of the laminations of the stator of the actuator.

* * * * *